United States Patent
Michel et al.

(10) Patent No.: US 9,273,757 B2
(45) Date of Patent: Mar. 1, 2016

(54) DUAL-CLUTCH TRANSMISSION

(71) Applicants: Christian Michel, Ravensburg (DE); Jürgen Wafzig, Eriskirch (DE); Michael Wechs, Sigmarszell (DE); Markus Renninger, Oerlenbach (DE); Thomas Rosemeier, Meckenbeuren (DE); Johannes Kaltenbach, Friedrichshafen (DE)

(72) Inventors: Christian Michel, Ravensburg (DE); Jürgen Wafzig, Eriskirch (DE); Michael Wechs, Sigmarszell (DE); Markus Renninger, Oerlenbach (DE); Thomas Rosemeier, Meckenbeuren (DE); Johannes Kaltenbach, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 14/364,753

(22) PCT Filed: Dec. 3, 2012

(86) PCT No.: PCT/EP2012/074203
§ 371 (c)(1),
(2) Date: Jun. 12, 2014

(87) PCT Pub. No.: WO2013/087435
PCT Pub. Date: Jun. 20, 2013

(65) Prior Publication Data
US 2014/0338497 A1 Nov. 20, 2014

(30) Foreign Application Priority Data
Dec. 14, 2011 (DE) .......................... 10 2011 088 605

(51) Int. Cl.
*F16H 3/08* (2006.01)
*F16H 3/093* (2006.01)
*F16H 3/00* (2006.01)
(Continued)

(52) U.S. Cl.
CPC ................ *F16H 3/093* (2013.01); *B60K 6/547* (2013.01); *F16H 3/006* (2013.01); *B60K 2006/4816* (2013.01); *F16H 2003/0931* (2013.01); *F16H 2003/0933* (2013.01); *F16H 2200/006* (2013.01); *Y02T 10/6256* (2013.01); *Y10S 903/902* (2013.01); *Y10T 74/19014* (2015.01); *Y10T 74/19228* (2015.01)

(58) Field of Classification Search
USPC .................................................. 74/330, 331
See application file for complete search history.

(56) References Cited

U.S. PATENT DOCUMENTS 4,738,149 A * 4/1988 Janiszewski .................... 74/330
6,209,407 B1 4/2001 Heinzel
(Continued)

FOREIGN PATENT DOCUMENTS

DE 201110100879 11/2012
EP 1013965 6/2000

*Primary Examiner* — Ha D Ho
(74) *Attorney, Agent, or Firm* — Cozen O'Connor

(57) ABSTRACT

A countershaft-type dual clutch transmission for a vehicle has two clutches having input sides connected to a driveshaft (AN) and output sides connected respectively to one of two transmission input shafts arranged coaxial to a mainshaft axis. A sub-transmission is associated in each instance with the transmission input shafts, at least two countershafts, a plurality of gear planes to which are assigned gear ratio steps, and at least one output shaft which can be connected to the sub-transmissions via an output gear plane. Only six gear planes with at least nine assigned gear ratio steps can be realized via only four double shift elements and at least one single shift element. Each countershaft can be coupled with four gear ratio steps via double shift elements, and one of the transmission input shafts can be coupled with a gear ratio step via a single shift element.

18 Claims, 10 Drawing Sheets

(51) Int. Cl.
  *B60K 6/547* (2007.10)
  *B60K 6/48* (2007.10)

(56) References Cited

U.S. PATENT DOCUMENTS

| | | | |
|---|---|---|---|
| 7,225,696 B2 * | 6/2007 | Gitt | 74/340 |
| 7,287,442 B2 * | 10/2007 | Gumpoltsberger | 74/331 |
| 7,604,565 B2 * | 10/2009 | Lee et al. | 477/3 |
| 8,365,623 B2 | 2/2013 | Rieger | |
| 8,365,626 B2 * | 2/2013 | Rieger et al. | 74/330 |
| 8,393,238 B2 | 3/2013 | Gumpoltsberger | |
| 8,474,340 B2 * | 7/2013 | Rieger et al. | 74/330 |
| 8,561,494 B2 * | 10/2013 | Okadome et al. | 74/331 |
| 8,578,801 B2 * | 11/2013 | Gumpoltsberger et al. | 74/331 |
| 2008/0141808 A1 * | 6/2008 | Gumpoltsberger | 74/340 |
| 2009/0036247 A1 * | 2/2009 | Earhart et al. | 475/35 |
| 2010/0255949 A1 * | 10/2010 | Mellet et al. | 475/271 |

* cited by examiner

|    | K1 | K2 | S1 | S2 | S3 | S4 | S5 | S6 | S7 | S8 | S9 |
|----|----|----|----|----|----|----|----|----|----|----|----|
| R1 | X  |    |    |    |    |    | X  |    |    |    |    |
| R2 |    | X  |    |    |    | X  |    |    |    |    |    |
| R3 | X  |    |    |    |    |    |    |    |    |    | X  |
| R4 |    | X  |    | X  |    |    |    |    |    |    |    |
| R5 | X  |    |    |    |    |    |    |    |    | X  |    |
| R6 |    | X  |    |    | X  |    |    |    |    |    |    |
| R7 | X  |    |    |    |    |    |    | X  |    |    |    |
| R8 |    | X  | X  |    |    |    |    |    |    |    |    |
| RR | X  |    |    |    |    |    |    |    | X  |    |    |

Fig. 2

| Shift element | Gear |
|---------------|------|
| S1 | R8 |
| S2 | R4 |
| S3 | R6 |
| S4 | R2 |
| S5 | R1 |
| S6 | R7 |
| S7 | RR |
| S8 | R5 |
| S9 | R3 |

Fig. 3

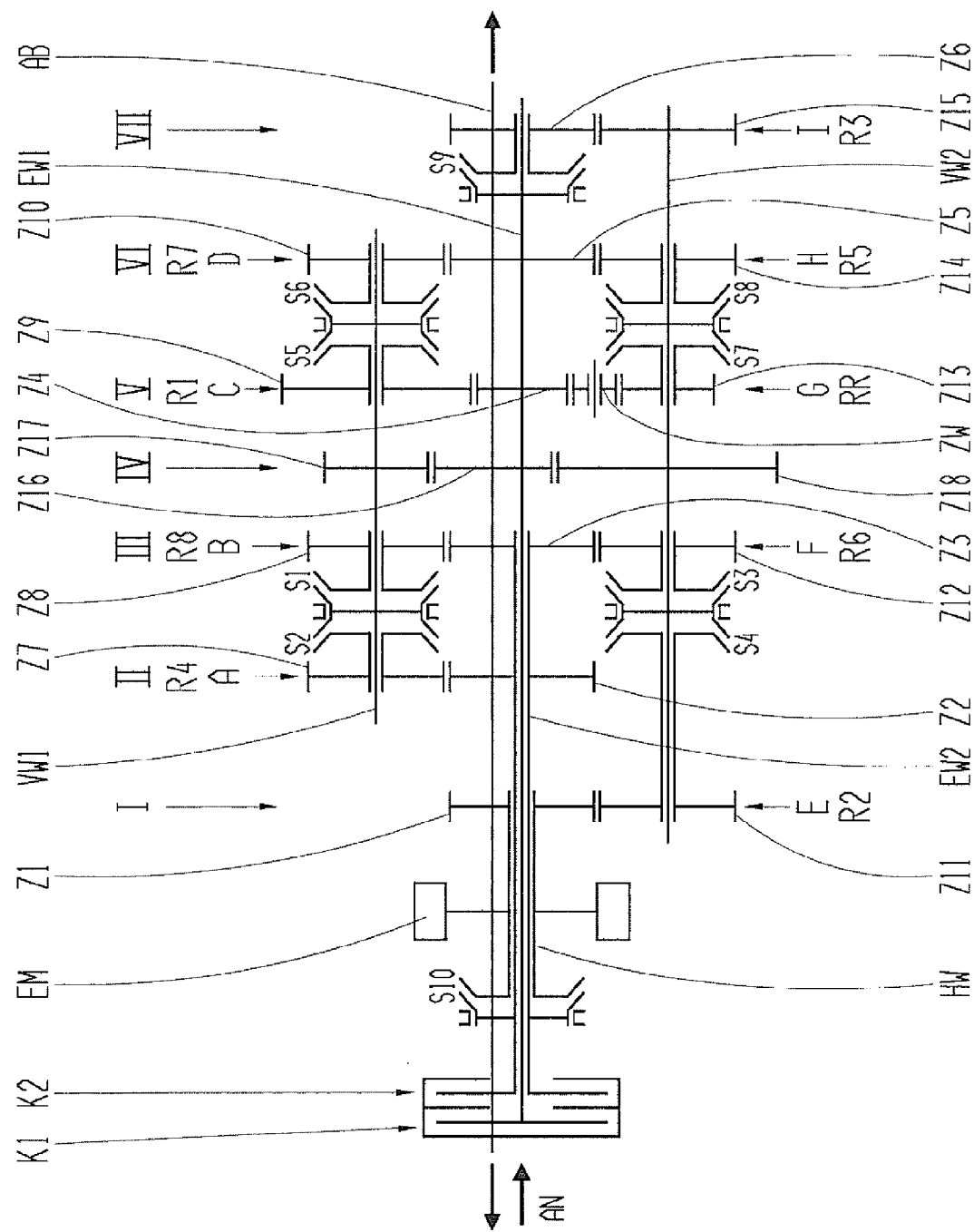

DUAL-CLUTCH TRANSMISSION

BACKGROUND OF THE INVENTION

1. Field of the Invention

The present invention is directed to a dual clutch transmission for a vehicle.

2. Description of the Related Art

U.S. Pat. No. 8,365,623 and U.S. Pat. No. 8,393,238 disclose a dual clutch transmission with two clutches having input sides connected to a driveshaft, while the output sides of the clutches are connected, respectively, to one of two transmission input shafts which are arranged coaxial to one another. Further, two countershafts are provided which are arranged axially parallel to one another. Three idler gears engaging with fixed gears of the transmission input shafts are associated with the countershafts in each instance. Six shift elements or coupling devices are required to shift the idler gears of the countershafts. In addition, a further shift element is provided for connecting two idler gears of a countershaft to one another. In total, at least three gear planes and one output gear plane are required to realize only six powershift-capable gear ratio steps, and a multiple use of gear ratio steps is required for implementing winding gears. When shifting winding gears, the two sub-transmissions are coupled with one another so that the powershift capability of the dual clutch transmission is limited.

It is an object of the present invention to provide a dual clutch transmission of the generic type mentioned above which makes do without the use of winding gears and which is constructed so as to be fully powershift-capable and requires the smallest possible installation space.

SUMMARY OF THE INVENTION

A proposed countershaft-type dual clutch transmission for a vehicle has two clutches as powershift elements having input sides which are connected to a driveshaft and having output sides which are connected respectively to one of two transmission input shafts arranged coaxial to a mainshaft axis. A sub-transmission is associated in each instance with the transmission input shafts. Further, at least two countershafts are provided which are disposed approximately axially parallel to one another. Assigned to the gear planes are gear ratio steps which can be connected via a driven gear plane to at least one driven shaft.

According to the invention, the dual clutch transmission comprises only six gear planes with at least nine assigned gear ratio steps which can be realized via only four double shift elements and at least one single shift element. In order to realize a particularly compact dual clutch transmission, preferably four gear ratio steps can be coupled with each countershaft via double shift elements, and one of the transmission input shafts can be coupled with a gear ratio step via a single shift element. In this way, at least nine speeds are realized in the dual clutch transmission according to the invention without twofold use of gear ratio steps, i.e., winding gears. In addition, a very good powershift capability results and, if required, a good hybridization capability.

A further advantage results in the present dual clutch transmission in that only five actuators are required for actuating the provided shift elements. On the one hand, this results in a particularly small installation space requirement and also in cost savings due to the small quantity of required actuators.

In a particularly advantageous manner, the dual clutch transmission according to the invention can be converted in an identically functioning manner by different positioning of the gear planes and spur gear steps or gearwheel steps assigned to the gear planes and/or of the shift elements or synchronizers when the assignment of the individual shift elements to the spur gear steps or gear ratio steps is retained. In this way, the respective shift matrix or shift scheme for the resulting gear set variants is not changed even when the arrangement of the gear ratio steps or shift elements is changed.

According to an embodiment of the dual clutch transmission according to the invention, component parts of the two sub-transmissions can be swapped. The term "component parts" denotes gearwheels as well as shift elements of the dual clutch transmission. For example, all of the component parts or only some of the component parts within the first sub-transmission can be mirrored or folded at predetermined mirror planes in order to obtain gear set variants which function identically to the basic variant. All of the component parts or only some of the component parts within the second sub-transmission can be mirrored at a predetermined mirror plane in order to obtain further gear set variants which function identically to the basic variant. Further, the assignment of the sub-transmissions to the first clutch and to the second clutch can be swapped in that the sub-transmissions can be mirrored at a mirror plane which is arranged between the two sub-transmissions in order to obtain further identically functioning gear set variants.

According to a further constructional embodiment of the dual clutch transmission according to the invention, different and/or additional power takeoffs or output shafts are provided. The output shaft of the dual clutch transmission communicates with the first countershaft and second countershaft via an output gear plane, and the output shaft can advantageously be arranged in the transmission space depending on the installation position and corresponding to the available installation space and depending on gear toothing requirements. Accordingly, the at least one vehicle axle to be driven can be connected to the transmission output at positions favoring installation space.

Further, hybridization can be carried out in the suggested dual clutch transmission according to another embodiment. The connection location of one or more electric machines should preferably be selected in such a way that the connection of the electric machines to the dual clutch and the connection of the electric machines to the power takeoff can be switched by a shift element or a syncronizer, or the like, of the gear set. This enables standstill charging capability and electric driving without drag losses in the dual clutch. To this end, the electric machines can be connected to a shaft, to a fixed gear, to an idler gear and/or to an additional gearwheel of the gear set.

With the provided shift elements, which can also be constructed as coupling elements or synchronizers, an idler gear, for example, is connected to an assigned shaft, for example, a solid shaft or a hollow shaft, in the activated or shifted condition. The shift elements can also be used for connecting shafts to one another.

BRIEF DESCRIPTION OF THE DRAWINGS

The present invention will be further described in the following with reference to the drawings in which:

FIG. 2 is a shift matrix of the dual clutch transmission according to FIG. 1;

FIG. 3 is an assignment table between shift elements and gear speeds for functionally identical gear set variants;

FIG. 11 is a schematic view of the dual clutch transmission with a further constructional variant for hybridization.

DETAILED DESCRIPTION OF THE PRESENTLY PREFERRED EMBODIMENTS

Figure 1:
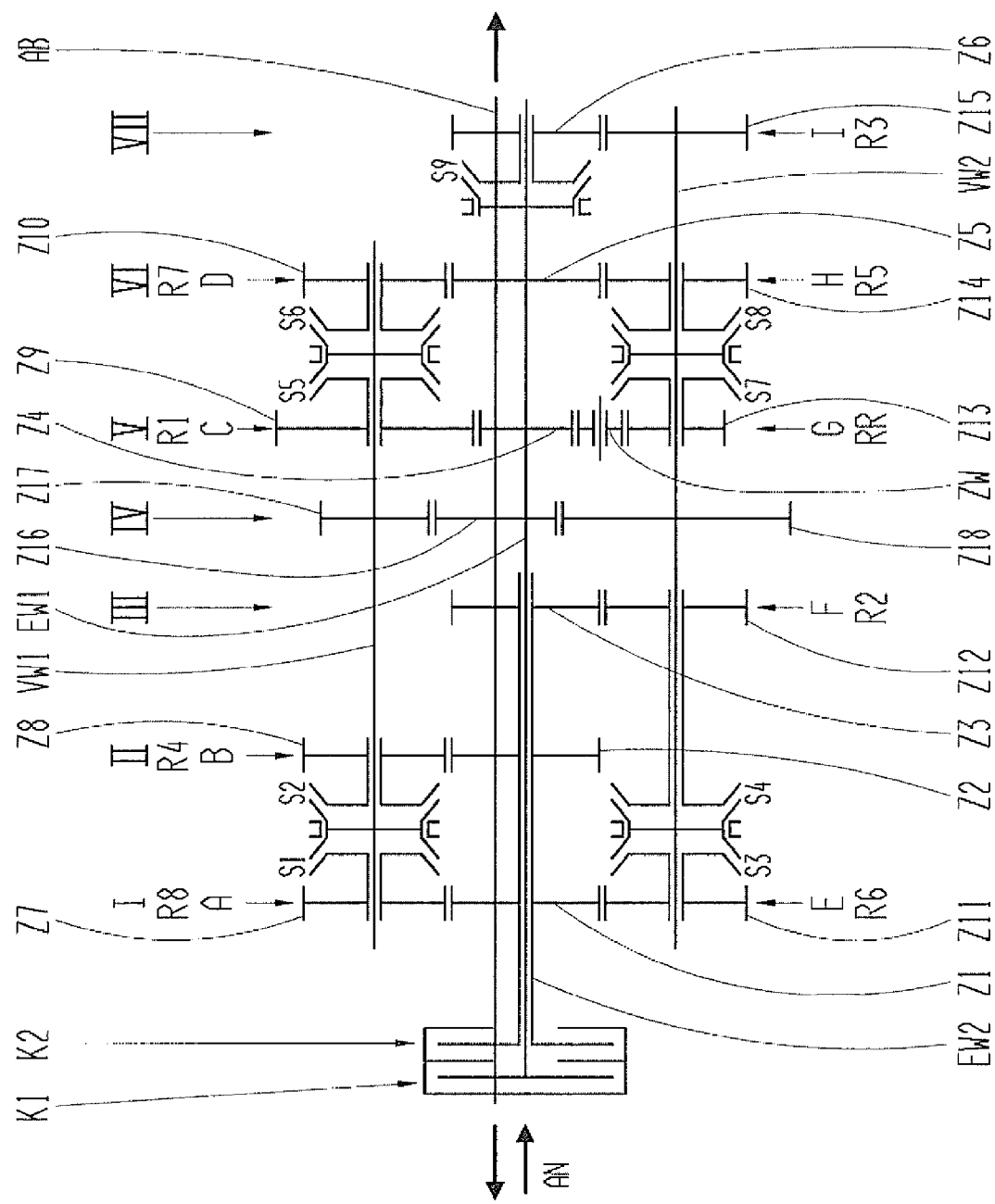
FIG. 1 is a schematic view of a constructional embodiment of a dual clutch transmission according to the invention.

Various constructional variants of a dual clutch transmission according to the invention are shown by way of example in the drawings. The countershaft-type dual clutch transmission for a vehicle comprises a dual clutch with a first clutch K1 and a second clutch K2 having input sides connected to a driveshaft AN and having output sides connected respectively to one of two transmission input shafts EW1, EW2 arranged coaxial to a mainshaft axis. The first transmission input shaft EW1 which is connected to the first clutch K1 is constructed a solid shaft, and the second transmission input shaft EW2 which is connected to the second clutch K2 is constructed as a hollow shaft.

The first sub-transmission is assigned to the first transmission input shaft EW1, and two fixed gears Z4, Z5 arranged coaxial to the mainshaft axis and an idler gear Z6 arranged coaxial to the mainshaft axis are provided at the first transmission input shaft EW1. The second sub-transmission is assigned to the second transmission input shaft EW2, and there are provided three fixed gears Z1, Z2 and Z3 which are arranged coaxial to the mainshaft axis.

The dual clutch transmission further comprises a first countershaft VW1 and a second countershaft VW2 disposed in axially parallel relationship to one another. Assigned to the first countershaft VW1 are four idler gears Z7, Z8, Z9 and Z10 arranged coaxial to the first countershaft VW1 and a fixed gear Z17 as output constant. Assigned to the second countershaft VW2 are four idler gears Z11, Z12, Z13 and Z14 arranged coaxial to the second countershaft VW2 and two fixed gears Z15, Z18, wherein fixed gear Z18 is provided as output constant.

It can be seen from FIGS. 1 and 4-11 that the dual clutch transmission comprises only six gear planes I, II, III, V, VI, VII, an output gear plane IV and only 19 gearwheels. Three gear planes V, VI, VII are assigned to the first sub-transmission and three gear planes I, II, III are assigned to the second sub-transmission. The output gear plane IV lies between the two sub-transmissions. At least eight forward gears R1, R2, R3, R4, R5, R6, R7, R8 and a reverse gear RR can be realized by the six gear planes I, II, III, V, VI, VII with the discrete gear ratio steps A, B, C, D, E, F, G, H, I. Only four double shift elements S1-S2, S3-S4, S5-S6 and S7-S8 and a single shift element S9 are provided for shifting the nine gear ratio steps A, B, C, D, E, F, G, H, I. In the arrangement of the dual clutch transmission which is shown by way of example, the odd numbered forward gears R1, R3, R5, R7 and the reverse gears RR are assigned to the first sub-transmission and the even numbered forward gear speeds R2, R4, R6, R8 are assigned to the second sub-transmission so that a fully powershift-capable dual clutch transmission is realized.

In the first gear plane I, the fixed gear Z1 of the second transmission input shaft EW2 engages with the idler gear Z7 of the first countershaft VW1 and with the idler gear Z11 of the second countershaft VW2, and the shift element S1 for connecting with the first countershaft VW1 is assigned to the idler gear Z7, and the shift element S3 for connecting with the second countershaft VW2 is assigned to idler gear Z11. In the second gear plane II, fixed gear Z2 of the second transmission input shaft EW2 engages with the idler gear Z8 of the first countershaft VW1, and shift element S2 for connecting with the first countershaft VW1 is assigned to idler gear Z8. In the third gear plane III, fixed gear Z3 of the second transmission input shaft EW2 engages with idler gear Z12 of the second countershaft VW2, and shift element S4 for connecting with the second countershaft VW2 is assigned to idler gear Z12. In the fourth gear plane IV, as output gear plane, fixed gear Z16 of the output shaft AB engages with fixed gear Z17 of the first countershaft VW1 and with fixed gear Z18 of the second countershaft VW2. In the fifth gear plane V, fixed gear Z4 of the first transmission input shaft EW1 engages with idler gear Z9 of the first countershaft VW1 and with the intermediate gear ZW for reversing the rotating direction, and intermediate gear ZW meshes with idler gear Z13 of the second countershaft VW2. The shift element S5 for connecting with the first countershaft VW1 is assigned to idler gear Z9 and the shift element S7 for connecting with the second countershaft VW2 is assigned to idler gear Z13. In the sixth gear plane VI, fixed gear Z5 of the first transmission input shaft EW1 engages with idler gear Z10 of the first countershaft VW1 and with idler gear Z14 of the second countershaft VW2, and the shift element S6 for connecting with the first countershaft VW1 is assigned to idler gear Z10, and the shift element S8 for connecting with the second countershaft VW2 is assigned to idler gear Z14. In the seventh gear plane, idler gear Z6 of the first transmission input shaft EW1 engages with fixed gear Z15 of the second countershaft VW2, and the shift element S9 for connecting with the first transmission input shaft EW1 is assigned to idler gear Z6.

The shift matrix shown in FIG. 2 gives the following gear speeds. The first forward gear R1 is shiftable proceeding from the first clutch K1 via the first transmission input shaft EW1, and the power flow is transmitted via the fifth gear plane V to the first countershaft VW1 and via the fourth gear plane IV to the output shaft AB when shift element S5 is activated. The second forward gear R2 is shiftable proceeding from the second clutch K2 via the second transmission input shaft EW2, and the power flow is transmitted via the third gear plane III to the second countershaft VW2 and via the fourth gear plane IV to the output shaft AB when shift element S4 is activated. The third forward gear R3 is shiftable proceeding from the first clutch K1 via the first transmission input shaft EW1, and the power flow is transmitted via the seventh gear plane VII to the second countershaft VW2 and via the fourth gear plane IV to the output shaft AB when shift element S9 is activated. The fourth forward gear R4 is shiftable proceeding from the second clutch K2 via the second transmission input shaft EW2, and the power flow is transmitted via the second gear plane II to the first countershaft VW1 and via the fourth gear plane IV to the output shaft AB when shift element S2 is activated. The fifth forward gear R5 is shiftable proceeding from the first clutch K1 via the first transmission input shaft EW1, and the power flow is transmitted via the sixth gear plane VI to the second countershaft VW2 and via the fourth gear plane IV to the output shaft AB when shift element S8 is activated. The sixth forward gear R6 is shiftable proceeding from the second clutch K2 via the second transmission input shaft EW2, and the power flow is transmitted via the first gear plane I to the second countershaft VW2 and via the fourth gear plane IV to the output shaft AB when shift element S3 is activated. The seventh forward gear R7 is shiftable proceeding from the first clutch K1 via the first transmission input shaft EW1, and the power flow is transmitted via the sixth gear plane VI to the first countershaft VW1 and via the fourth gear plane IV to the output shaft AB when shift element S6 is activated. The eighth forward gear R8 is shiftable proceeding from the second clutch K2 via the second transmission input shaft EW2, and the power flow is transmitted via the first gear plane I to the first countershaft VW1 and via the fourth gear plane IV to the output shaft AB when shift element S1 is activated. The reverse gear RR is shiftable proceeding from the first clutch K1 via the first transmission input shaft EW1, and the power flow is transferred via the fifth gear plane V to the second countershaft VW2 and via the fourth gear plane IV to the output shaft AB when shift element S7 is activated.

Accordingly, for example, the first forward gear R1 is assigned to the discrete gear ratio step C of the first sub-transmission, the second forward gear R2 is assigned to the discrete gear ratio step F of the second sub-transmission, the third forward gear R3 is assigned to the discrete gear ratio step I of the first sub-transmission, the fourth forward gear R4 is assigned to the discrete gear ratio step B of the second sub-transmission, the fifth forward gear R5 is assigned to the discrete gear ratio step H of the first sub-transmission, the sixth forward gear R6 is assigned to the discrete gear ratio step E of the second sub-transmission, the seventh forward gear R7 is assigned to the discrete gear ratio step D of the first sub-transmission, the eighth forward gear R8 is assigned to the discrete gear ratio step A of the second sub-transmission, and the reverse gear RR is assigned to the discrete gear ratio step G of the second sub-transmission.

The assignment table in FIG. 3 shows the assignment with respect to shift element and gear so that the same shift matrix or the same shift scheme can be used in the below-described gear set variants resulting from a new arrangement of the spur gear steps and shift elements. Accordingly, shift element S1 is assigned to the eighth forward gear R8, shift element S2 is assigned to the fourth forward gear R4, shift element S3 is assigned to the sixth forward gear R6, shift element S4 is assigned to the second forward gear R2, shift element S5 is assigned to the first forward gear R1, shift element S6 is assigned to the seventh forward gear R7, shift element S7 is assigned to the reverse gear RR, shift element S8 is assigned to the fifth forward gear R5, and shift element S9 is assigned to the third forward gear R3.

Figure 4:
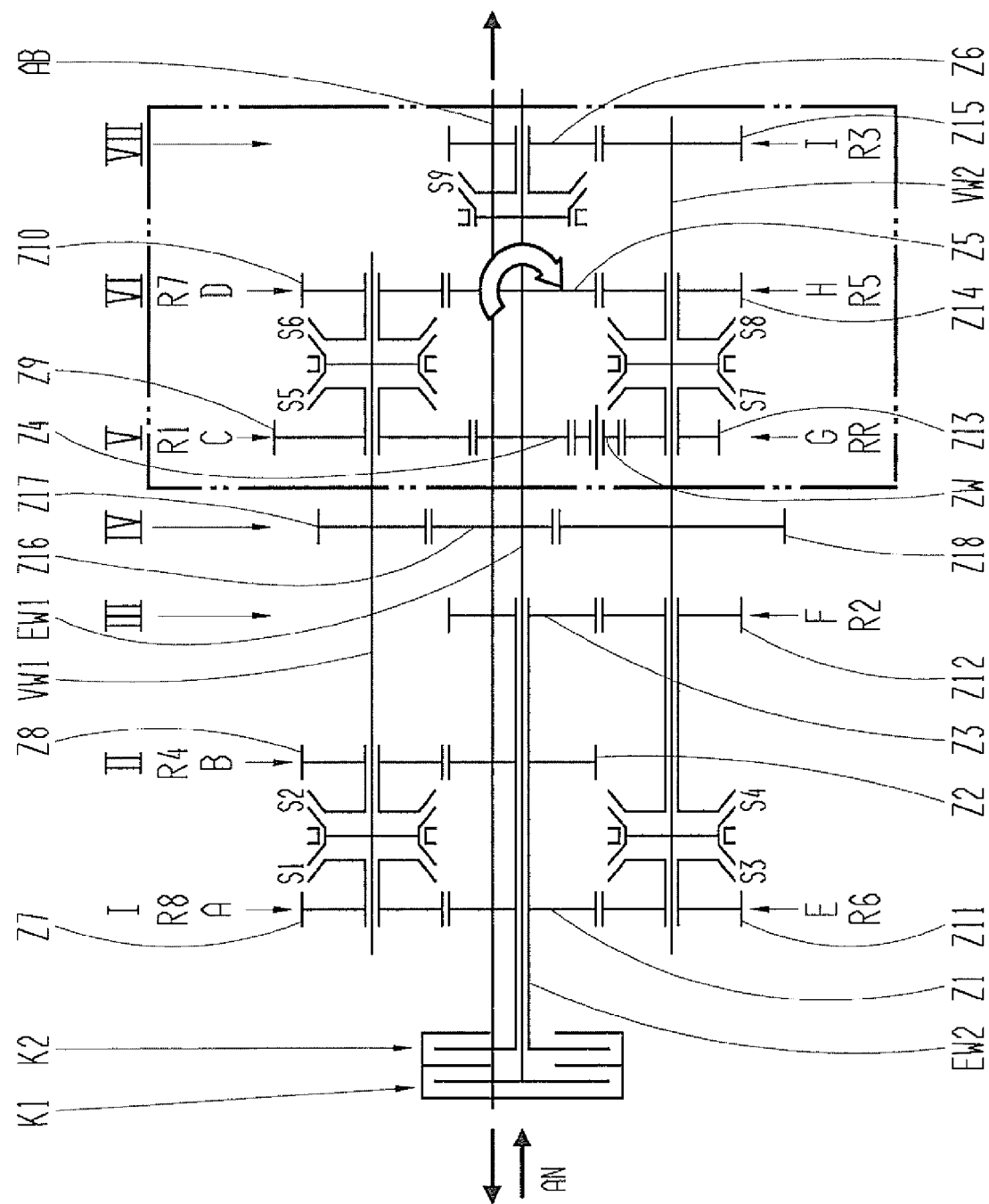
FIG. 4 is a schematic view of the dual clutch transmission with gear set variants by binomial swapping of gear ratio steps within the first sub-transmission.
Figure 5:
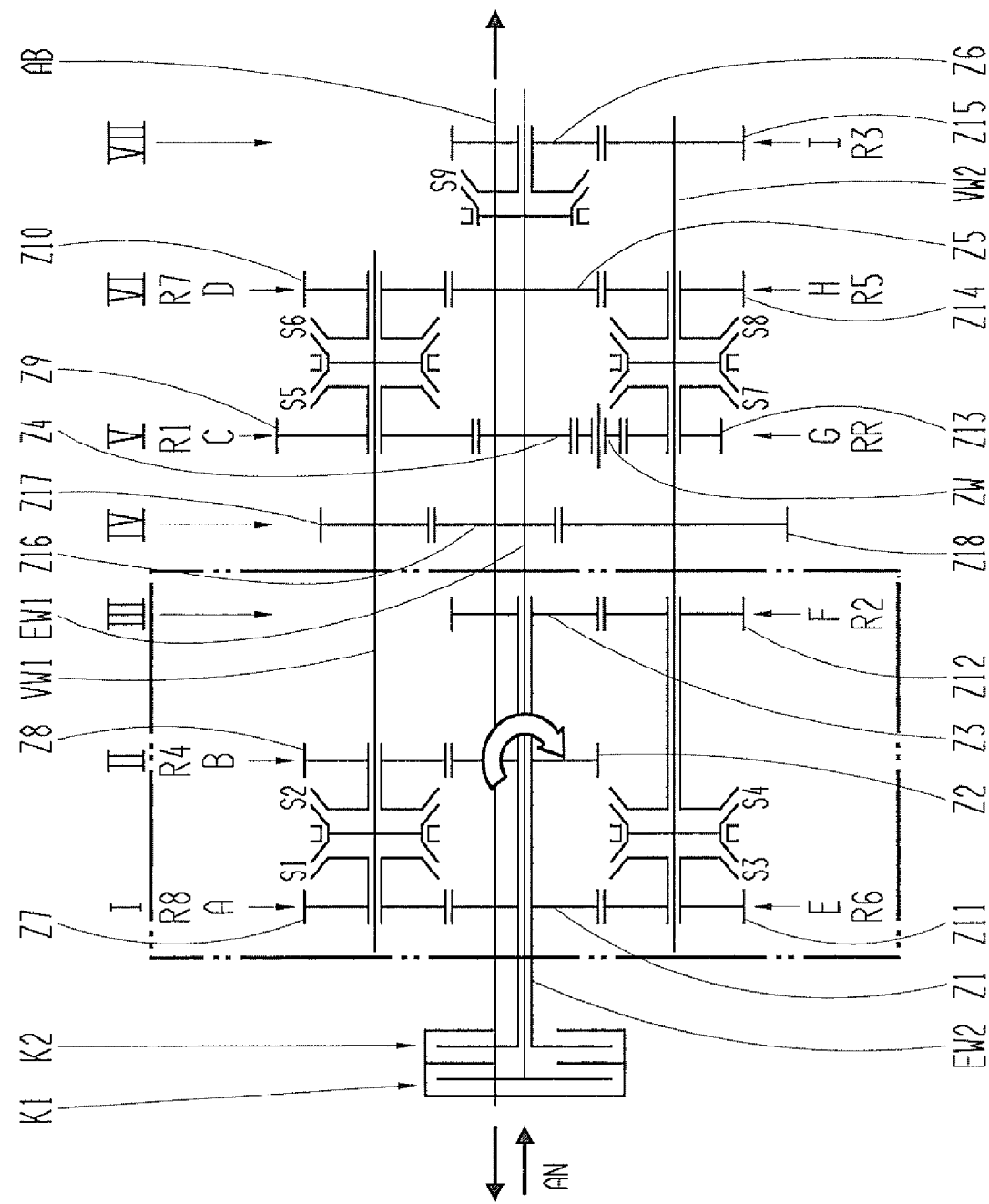
FIG. 5 is a schematic view of the dual clutch transmission with gear set variants by binomial swapping of gear ratio steps within the second sub-transmission.

FIGS. 4 and 5 show possible variations using the example of the gear set of the dual clutch transmission according to the invention. The variations are indicated by boxes and arrows. FIG. 4 shows a gear set variant in which the spur gear steps or gear ratio steps C, D, G, H, I of the first sub-transmission can be swapped binomially. This means that each of the above-mentioned gear ratio steps can be positioned at any position of another gear ratio step within the box. FIG. 5 shows a gear set variant in which the spur gear steps or gear ratio steps A, B, E, F of the second sub-transmission can be swapped binomially. This means that each of the above-mentioned gear ratio steps can be positioned at any position of another gear ratio step within the box.

Figure 6:
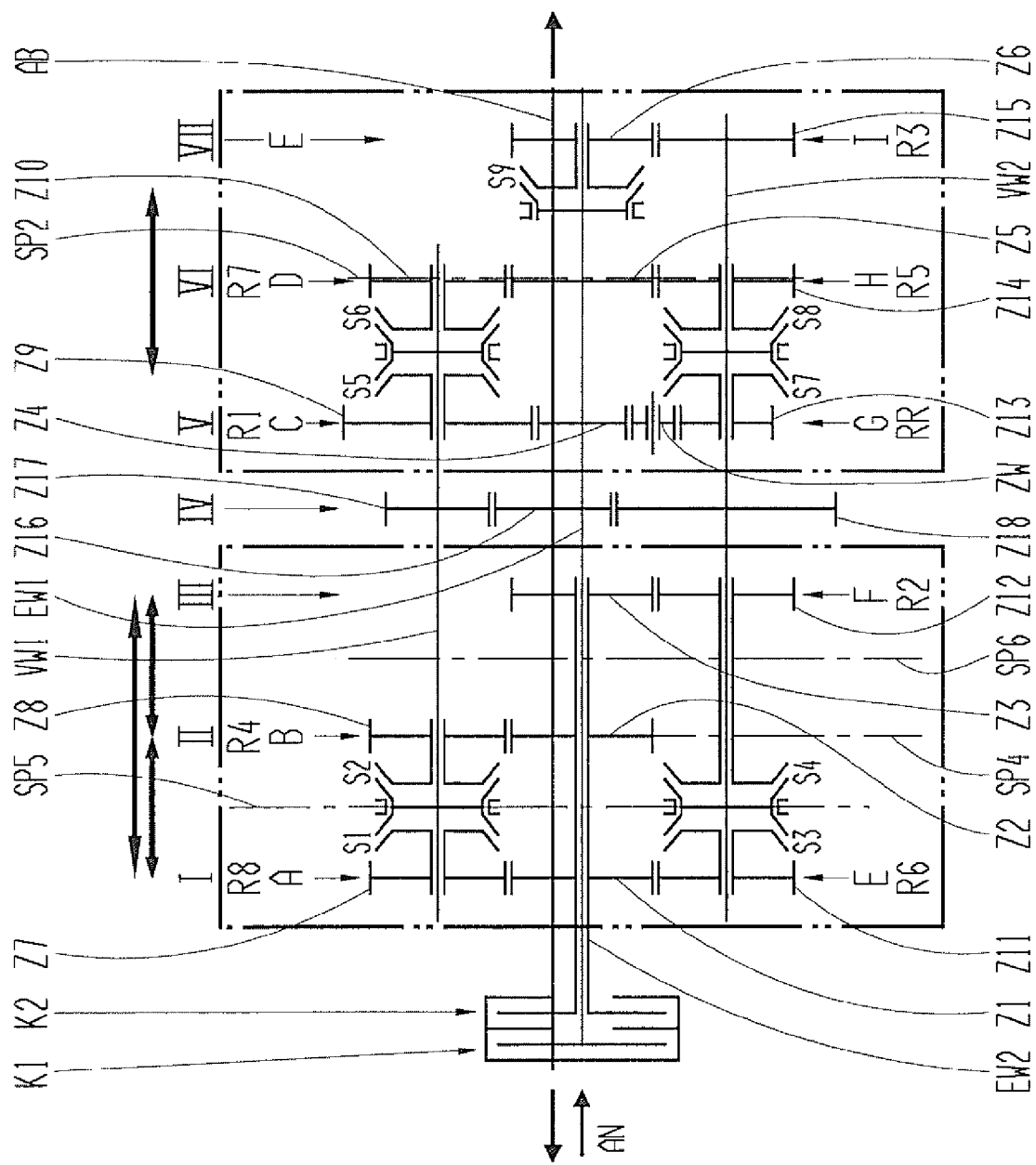
FIG. 6 is a schematic view of the dual clutch transmission with gear set variants by mirroring of component parts within the sub-transmissions at mirror planes oriented perpendicular to the mainshaft axis.
Figure 7:
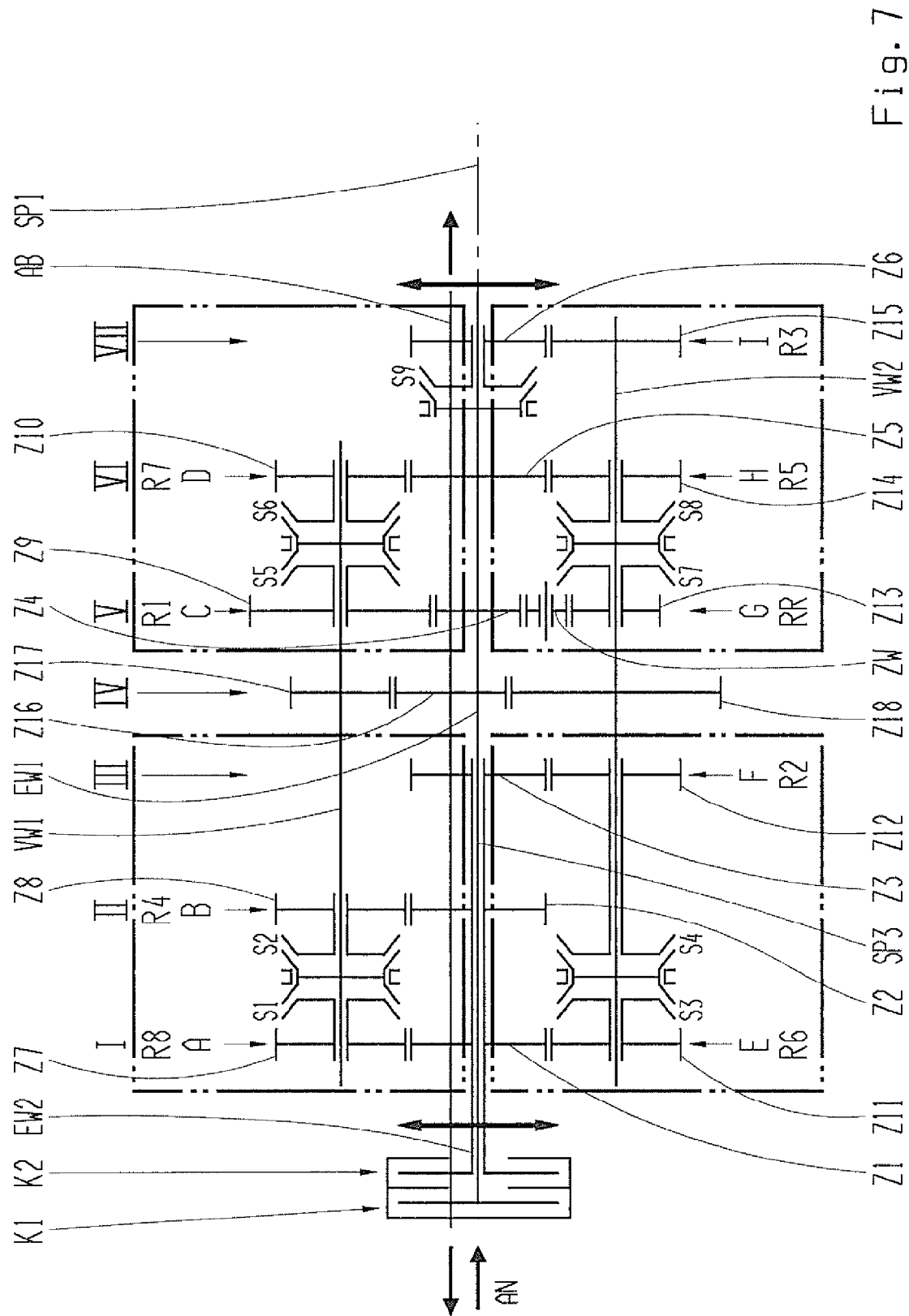
FIG. 7 is a schematic view of the dual clutch transmission with gear set variants by mirroring of component parts within the sub-transmissions at mirror planes extending along the mainshaft axis.
Figure 8:
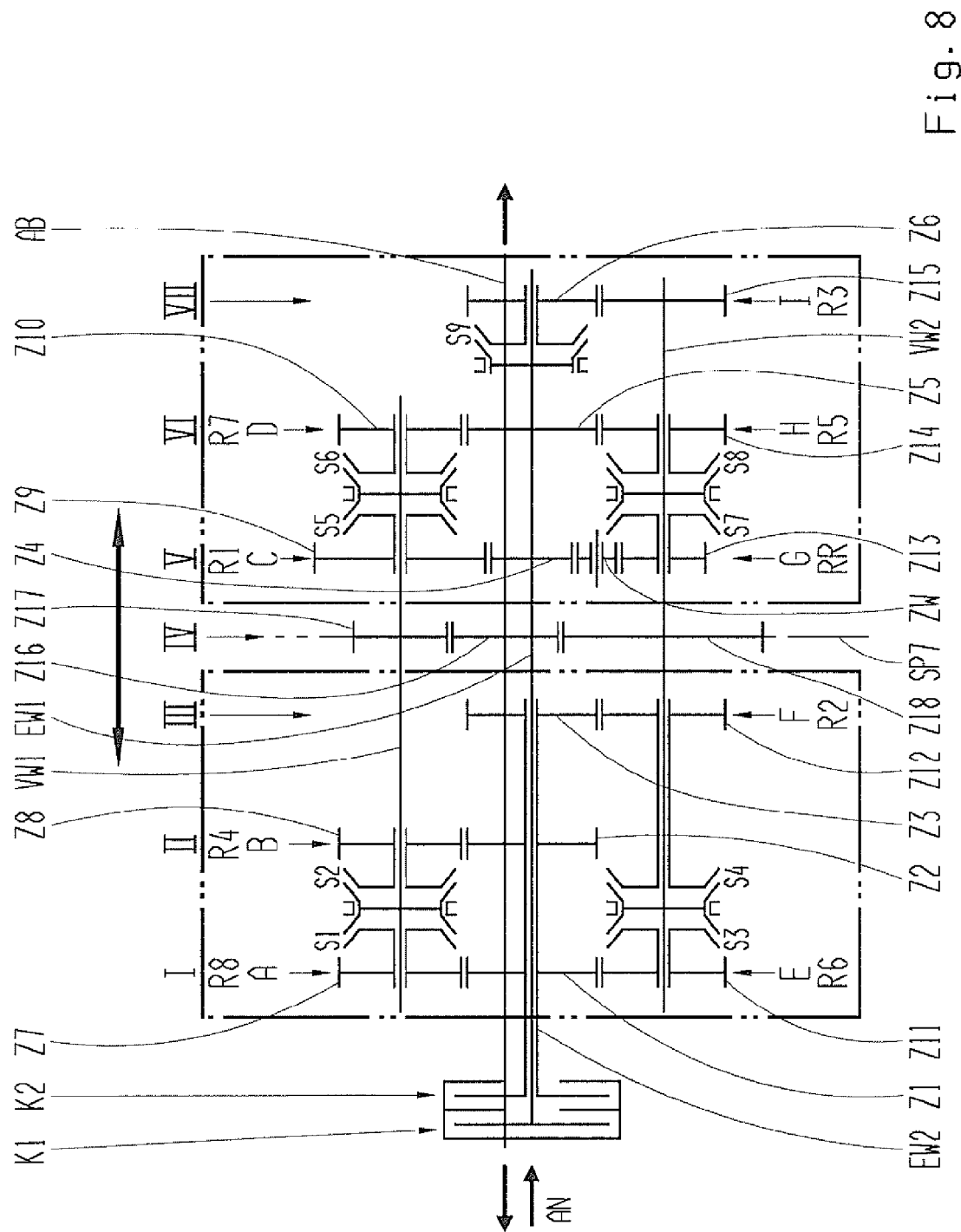
FIG. 8 is a schematic view of the dual clutch transmission with a gear set variant with swapped sub-transmissions.

FIGS. 6 to 8 show possible variations using the example of the gear set of the dual clutch transmission according to the invention in which variants indicated by boxes and arrows are generated by mirroring within the sub-transmission or between the sub-transmissions.

FIG. 6 shows mirror planes SP4, SP5, SP6, which are oriented vertical to or perpendicular to the mainshaft axis with respect to the drawing plane, in relation to the second sub-transmission and a mirror plane SP2 in relation to the first sub-transmission. Mirror plane SP2 extends along the sixth gear plane VI such that the component parts, i.e., the gearwheels and shift elements, are swapped within the first sub-transmission in that the fifth gear plane and the seventh gear plane are swapped or are mirrored or folded at mirror plane SP2. Mirror plane SP4 extends along the second gear plane II such that the component parts, i.e., the gearwheels and shift elements, are swapped within the second sub-transmission in that the first gear plane I and the third gear plane III are swapped in that they are mirrored or folded at mirror plane SP4. Mirror plane SP5 extends medially between the first gear plane I and the second gear plane II such that the component parts are swapped within the second sub-transmission in that the first gear plane I and the second gear plane II are swapped in that they are mirrored or folded at mirror plane SP5. Mirror plane SP6 extends medially between the second gear plane II and the third gear plane III such that the component parts are swapped within the second sub-transmission in that the second gear plane II and the third gear plane III are swapped in that they are mirrored or folded at mirror plane SP6.

FIG. 7 shows mirror planes SP1 and SP3 which are oriented horizontally with respect to the drawing plane and extend along the mainshaft axis. Mirror plane SP1 extends in the area of the first sub-transmission along the mainshaft axis such that the component parts arranged in the two boxes are swapped in that the component parts of the two boxes are mirrored or folded at mirror plane SP1. Mirror plane SP3 extends in the area of the second sub-transmission along the mainshaft axis such that the component parts arranged in the two boxes are swapped in that the component parts of the two boxes are mirrored or folded at mirror plane SP3.

FIG. 8 shows a variation of the gear set of the dual clutch transmission according to the invention in which the assignment of the sub-transmissions to the two input clutches K1 and K2 is swapped without modifying the shift scheme. Also, a mirror plane SP7 extending perpendicular to the mainshaft axis is provided between the two sub-transmissions, the component parts and sub-transmissions contained in the boxes being folded or mirrored at this mirror plane SP7. Mirror plane SP7 separates the two sub-transmissions from one another.

Figure 9:
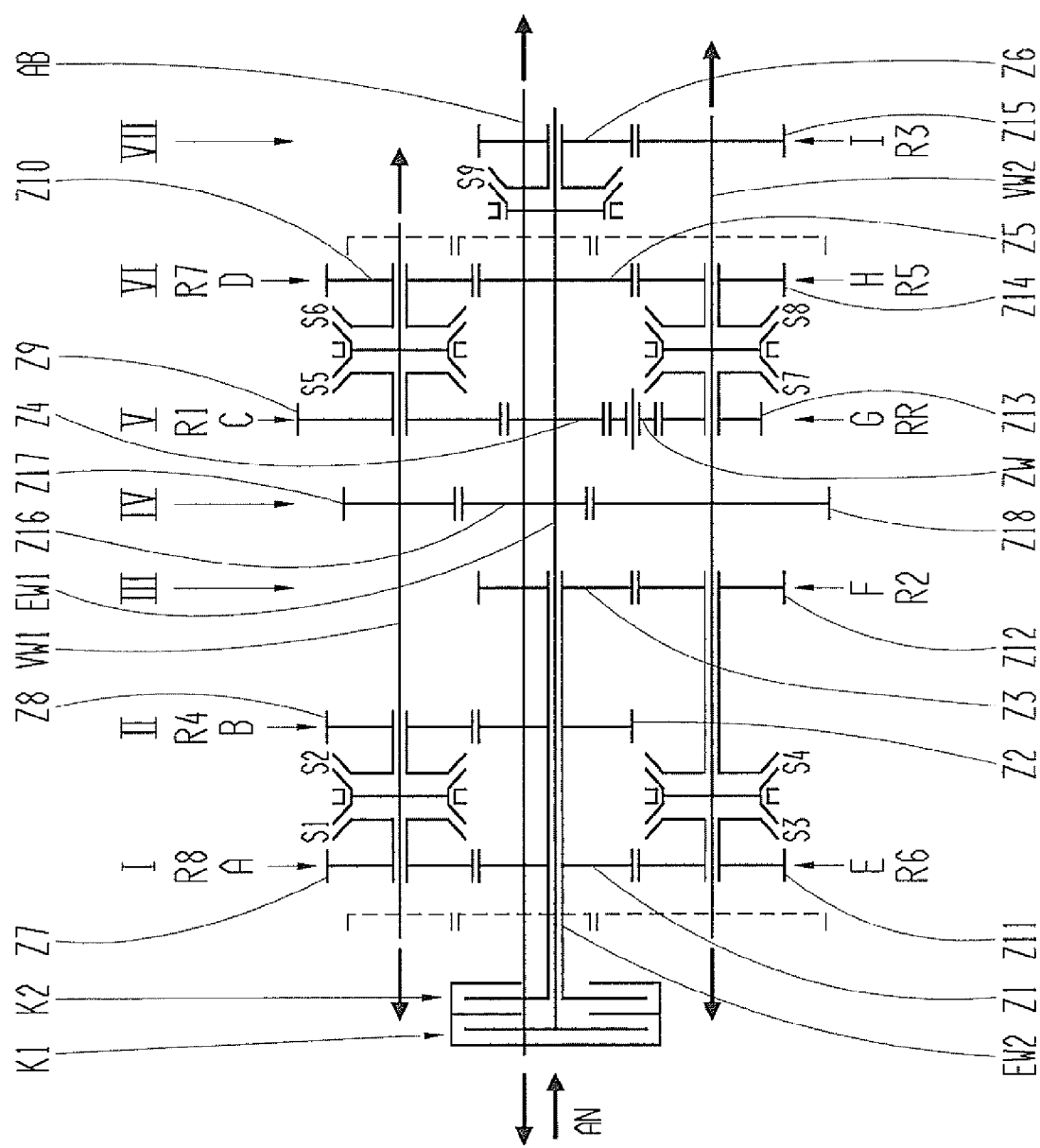
FIG. 9 is a schematic view of the dual clutch transmission with variations with respect to the output position.

FIG. 9 shows a gear set of the dual clutch transmission with output variants, and alternative arrangement positions of the fourth gear plane IV as output gear plane are indicated by dashed lines. Since the first countershaft VW1 and the second countershaft VW2 are coupled with one another via the fourth gear plane IV as output gear plane, it is possible that a plurality output positions which are adapted to the available installation space and to the gear toothing requirements can be realized in order to connect one or more drive axles of the vehicle to the transmission output. It can be seen from FIG. 9 that six different output options, indicated by arrows by way of example, can be realized which are provided either at the output shaft AB or at one of the countershafts VW1, VW2.

Figure 10:
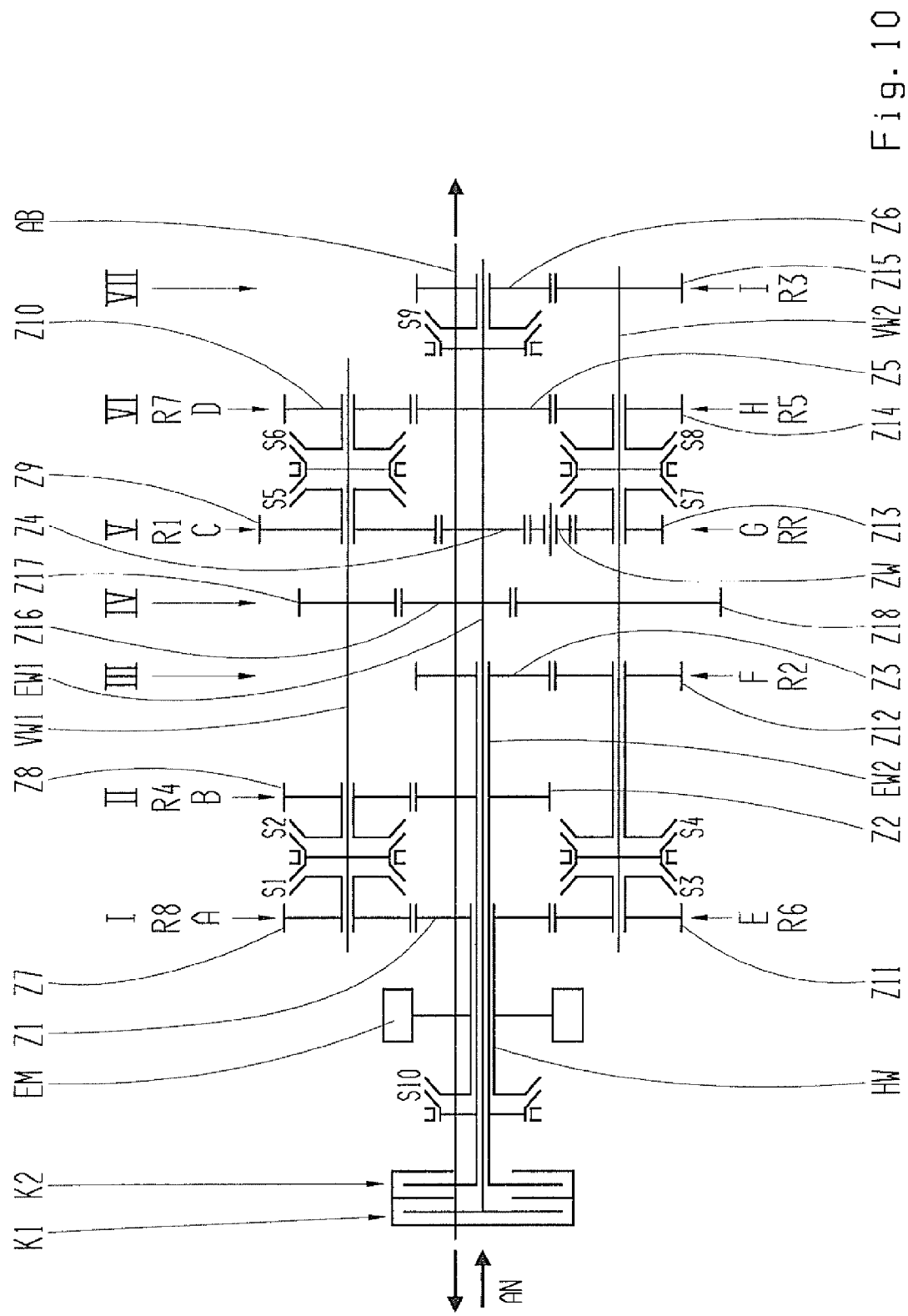
FIG. 10 is a schematic view of the dual clutch transmission with a possible constructional variant for hybridization.

FIGS. 10 and 11 show possible constructional variants of a hybridization of the dual clutch transmission according to the invention. An electric machine EM is provided for this purpose. A connection to the first gear plane I and to the assigned gear ratio steps A and E is provided as possible connection point of the electric machine EM, for example. A hollow shaft HW arranged coaxial to the mainshaft axis is provided for this purpose. The electric machine EM is connected to the hollow shaft HW, and the hollow shaft HW additionally comprises the fixed gear Z1. The hollow shaft HW can be connected to the second transmission input shaft EW2 via an additional single shift element S10. For example, electric driving is possible with gear ratio steps A and E with shift element S10 open without drag losses of the dual clutch. The shift matrix of the above-described gear set also applies to hybrid operation when shift element S10 is closed.

In order to provide a more advantageous gear ratio during fully electric driving with the electric machine EM, the gear planes of the dual clutch transmission can be rearranged. A variant of this kind in which the second countershaft VW2 is assigned to gear ratio step E in the first gear plane I is shown by way of example in FIG. 11. This allows electric driving in the second countershaft VW2 with shift element S10 open without drag losses of the dual clutch. The rearrangement does not alter the shift matrix. Therefore, the shift matrix of the gear set described above also applies to hybrid operation when shift element S10 is closed.

REFERENCE NUMERALS

AN driveshaft
AB output shaft
EW1 first transmission input shaft as solid shaft
EW2 second transmission input shaft as hollow shaft
HW hollow shaft of the second transmission input shaft
VW1 first countershaft
VW2 second countershaft
K1 first clutch
K2 second clutch
A gear ratio step
B gear ratio step
C gear ratio step
D gear ratio step
E gear ratio step
F gear ratio step
G gear ratio step
H gear ratio step
I gear ratio step
S1 shift element
S2 shift element
S3 shift element
S4 shift element
S5 shift element
S6 shift element
S7 shift element
S8 shift element
S9 shift element
S10 shift element
I first gear plane
II second gear plane
III third gear plane
IV fourth gear plane
V fifth gear plane
VI sixth gear plane
VII seventh gear plane
Z1 fixed gear of the second transmission input shaft
Z2 fixed gear of the second transmission input shaft
Z3 fixed gear of the second transmission input shaft
Z4 fixed gear of the first transmission input shaft
Z5 fixed gear of the first transmission input shaft
Z6 idler gear of the first transmission input shaft
Z7 idler gear of the first countershaft
Z8 idler gear of the first countershaft
Z9 idler gear of the first countershaft
Z10 idler gear of the first countershaft
Z11 idler gear of the second countershaft
Z12 idler gear of the second countershaft
Z13 idler gear of the second countershaft
Z14 idler gear of the second countershaft
Z15 fixed gear of the second countershaft
Z16 fixed gear of the output shaft
Z17 fixed gear of the first countershaft
Z18 fixed gear of the second countershaft
ZW intermediate gear for reversing rotating direction
SP1 mirror plane
SP2 mirror plane
SP3 mirror plane
SP4 mirror plane
SP5 mirror plane
SP6 mirror plane
SP7 mirror plane
EM electric machine
R1 first forward gear speed
R2 second forward gear speed
R3 third forward gear speed
R4 fourth forward gear speed
R5 fifth forward gear speed
R6 sixth forward gear speed
R7 seventh forward gear speed
R8 eighth forward gear speed
RR reverse gear speed Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A dual clutch transmission for a vehicle comprising:
    first and second clutches (K1, K2) having input sides connected to a driveshaft (AN) and output sides connected respectively to one of a first and second transmission input shaft (EW1, EW2) arranged coaxial to a mainshaft axis;
    a first and second sub-transmission each associated with a respective one of the first and second transmission input shafts (EW1, EW2);
    at least a first and second countershaft (VW1, VW2), with a plurality of gear planes comprising a first, second, third, fifth, sixth and seventh gear plane (I, II, III, V, VI, VII) to which are assigned gear ratio steps (A, B, C, D, E, F, G, H, I);

at least one output shaft (AB) connectable to the first and second sub-transmissions via an output gear plane (IV); four double shift elements comprising a first, second, third and fourth double shift element (S1-S2, S3-S4, S5-S6, S7-S8) and at least one single shift element (S9, S10) constructed so as to realize six gear planes (I, II, III, V, VI, VII) with at least nine assigned gear ratio steps comprising gear ratio step A, gear ratio step B, gear ratio step C, gear ratio step D, gear ratio step E, gear ratio step F, gear ratio step G, gear ratio step H and gear ratio step I, wherein each countershaft (VW1, VW2) can be coupled with four gear ratio steps (A, B, C, D; E, F, G, H) via one of the double shift elements (S1-S2, S3-S4, S5-S6, S7-S8), and wherein one of the transmission input shafts (EW1, EW2) can be coupled with a gear ratio step (I) via the single shift element (S9).

2. The dual clutch transmission according to claim 1, wherein the first transmission input shaft (EW1) is constructed as a solid shaft, and comprises first and second fixed gears (Z4, Z5) arranged coaxial to the mainshaft axis and an idler gear (Z6) arranged coaxial to the mainshaft axis, the fixed gears (Z4, Z5) and the idler gear (Z6) being assigned to the first transmission input shaft (EW1), and wherein the idler gear (Z6) can be connected to the first transmission input shaft (EW1) via the single shift element (S9).

3. The dual clutch transmission according to claim 2, wherein the second transmission input shaft (EW2) is constructed as a hollow shaft, and comprising first, second and third fixed gears (Z1, Z2, Z3) arranged coaxial to the mainshaft axis and assigned to the second transmission input shaft (EW2).

4. The dual clutch transmission according to claim 3, wherein the first countershaft (VW1) is constructed as solid shaft arranged coaxial to a first countershaft axis; the first countershaft (VW1) comprising a fixed gear (Z17) arranged coaxial to the first countershaft axis as output constant to the first countershaft (VW1) and idler gears comprising a first, second, third and fourth idler gear (Z7, Z8, Z9, Z10) arranged coaxial to the first countershaft axis and assigned to the first countershaft (VW1); and wherein the first idler gear (Z7) and the second idler gear (Z8) can be connected to the first countershaft (VW1) in each instance via the first double shift element (S1-S2), and the third idler gear (Z9) and fourth idler gear (Z10) can be connected to the first countershaft (VW1) in each instance via the third double shift element (S5-S6).

5. The dual clutch transmission according to claim 4, wherein the second the countershaft (VW2) is constructed as a solid shaft, the second countershaft (VW2) comprising first and second fixed gears (Z18, Z15) arranged coaxial to the second countershaft axis and assigned to the second countershaft (VW2) and four idler gears comprising a first, second, third and fourth idler gear (Z11, Z12, Z13, Z14) arranged coaxial to the second countershaft axis and assigned to the second countershaft (VW2); and wherein the first idler gear (Z11) and the second idler gear (Z12) can be connected to the second countershaft (VW2) in each instance via the second double shift element (S3-S4), and the third idler gear (Z13) and fourth idler gear (Z14) can be connected to the second countershaft (VW2) in each instance via the fourth double shift element (S7-S8), and wherein the first fixed gear (Z18) is provided as output constant.

6. The dual clutch transmission according to claim 5, wherein in the first gear plane (I) the first fixed gear (Z1) of the second transmission input shaft (EW2) engages with the first idler gear (Z7) of the first countershaft (VW1) and with the first idler gear (Z11) of the second countershaft (VW2), wherein in a second gear plane (II) the second fixed gear (Z2) of the second transmission input shaft (EW2) engages with the second idler gear (Z8) of the first countershaft (VW1), wherein in a third gear plane (III) the third fixed gear (Z3) of the second transmission input shaft (EW2) engages with the second idler gear (Z12) of the second countershaft (VW2), wherein in a fourth gear plane (IV), as output gear plane, the output shaft (AB) having a fixed gear (Z16) which meshes with the fixed gear (Z17) of the first countershaft (VW1) and with the fixed gear (Z18) of the second countershaft (VW2), wherein in a fifth gear plane (V) the first fixed gear (Z4) of the first transmission input shaft (EW1) engages with the third idler gear (Z9) of the first countershaft (VW1) and with an intermediate gear (ZW) for reversing the rotating direction; wherein the intermediate gear (ZW) meshes with the third idler gear (Z13) of the second countershaft, wherein in a sixth gear plane (VI) the second fixed gear (Z5) of the first transmission input shaft (EW1) engages with the fourth idler gear (Z10) of the first countershaft (VW1) and with the fourth idler gear (Z14) of the second countershaft (VW2), and wherein in a seventh gear plane (VII) the idler gear (Z6) of the first transmission input shaft (EW1) meshes with second fixed gear (Z15) of the second countershaft (VW2).

7. The dual clutch transmission according to claim 1, wherein the gear ratio step A is shiftable proceeding from the second clutch (K2) via the second transmission input shaft (EW2), wherein the power flow is transmitted via the first gear plane (I) to the first countershaft (VW1) and via the fourth gear plane (IV) to the output shaft (AB) when shift element (S1) is activated; wherein the gear ratio step B is shiftable proceeding from the second clutch (K2) via the second transmission input shaft (EW2), wherein the power flow is transmitted via the second gear plane (II) to the first countershaft (VW1) and via the fourth gear plane (IV) to the output shaft (AB) when shift element (S2) is activated; wherein the gear ratio step C is shiftable proceeding from the first clutch (K1) via the first transmission input shaft (EW1), wherein the power flow is transmitted via the fifth gear plane (V) to the first countershaft (VW1) and via the fourth gear plane (IV) to the output shaft (AB) when shift element (S5) is activated; wherein the gear ratio step D is shiftable proceeding from the first clutch (K1) via the first transmission input shaft (EW1), wherein the power flow is transmitted via the sixth gear plane (VI) to the first countershaft (VW1) and via the fourth gear plane (IV) to the output shaft (AB) when shift element (S6) is activated; wherein the gear ratio step E is shiftable proceeding from the second clutch (K2) via the second transmission input shaft (EW2), wherein the power flow is transmitted via the first gear plane (I) to the second countershaft (VW2) and via the fourth gear plane (IV) to the output shaft (AB) when shift element (S3) is activated; wherein the gear ratio step F is shiftable proceeding from the second clutch (K2) via the second transmission input shaft (EW2), wherein the power flow is transmitted via the third gear plane (III) to the second countershaft (VW2) and via the fourth gear plane (IV) to the output shaft (AB) when shift element (S4) is activated; wherein the gear ratio step G is shiftable proceeding from the first clutch (K1) via the first transmission input shaft (EW1), wherein the power flow is transmitted via the fifth gear plane (V) to the second countershaft (VW2) and via the fourth gear plane (IV) to the output shaft (AB) when shift element (S7) is activated; wherein the gear ratio step H is shiftable proceeding from the first clutch (K1) via the first transmission input shaft (EW1), wherein the power flow is transmitted via the sixth gear plane (VI) to the second countershaft (VW2) and via the fourth gear plane (IV) to the output shaft (AB) when shift element (S8) is activated; and wherein the gear ratio step I is shiftable proceeding from the first clutch (K1) via the first transmission input shaft (EW1), wherein the power flow is transmitted via the seventh gear plane (VII) to the second countershaft (VW2) and via the fourth gear plane (IV) to the output shaft (AB) when shift element (S8) is activated.

8. The dual clutch transmission according to claim 7, wherein the gear ratio step C of the first sub-transmission is assigned to a first forward gear (R1), wherein the gear ratio step F of the first sub-transmission is assigned to a second forward gear (R2), wherein the gear ratio step I of the first sub-transmission is assigned to a third forward gear (R3), wherein the gear ratio step B of the second sub-transmission is assigned to a fourth forward gear (R4), wherein the gear ratio step H of the first sub-transmission is assigned to a fifth forward gear (R5), wherein the gear ratio step E of the second sub-transmission is assigned to a sixth forward gear (R6), wherein the gear ratio step D of the first sub-transmission is assigned to a seventh forward gear (R7), wherein the gear ratio step A of the second sub-transmission is assigned to a eighth forward gear (R8), and wherein the gear ratio step G of the second sub-transmission is assigned to a reverse gear (RR).

9. The dual clutch transmission according to claim 1, wherein the first sub-transmission comprises component parts, and wherein the component parts within the first sub-transmission can be mirrored at predetermined first and second minor planes (SP1, SP2).

10. The dual clutch transmission according to claim 9, wherein the first mirror plane (SP1) extends along the mainshaft axis in the area of the first sub-transmission.

11. The dual clutch transmission according to claim 9, wherein the second minor plane (SP2) extends perpendicular to the mainshaft axis along the sixth gear plane (VI).

12. The dual clutch transmission according to claim 1, wherein the second sub-transmission comprises component parts and wherein the component parts within the second sub-transmission can be mirrored at mirror planes comprising a third, fourth, fifth and sixth minor plane (SP3, SP4, SP5, SP6).

13. The dual clutch transmission according to claim 12, wherein the third mirror plane (SP3) extends along the mainshaft axis in the area of the second sub-transmission.

14. The dual clutch transmission according to claim 12, wherein the fourth minor plane (SP4) extends perpendicular to the mainshaft axis along the second gear plane (II).

15. The dual clutch transmission according to claim 12, wherein the fifth minor plane (SP5) extends perpendicular to the mainshaft axis between the first gear plane (I) and the second gear plane (II).

16. The dual clutch transmission according to claim 12, wherein the sixth mirror plane (SP6) extends perpendicular to the mainshaft axis between the second gear plane (II) and the third gear plane (III).

17. The dual clutch transmission according to claim 12, wherein the assignment of the sub-transmissions to the first clutch (K1) and to the second clutch (K2) can be swapped in that the sub-transmissions can be mirrored at a seventh mirror plane (SP7) between the two sub-transmissions.

18. The dual clutch transmission according to claim 1, additionally comprising at least one electric machine (EM) for hybridization; and wherein the electric machine (EM) is constructed so as to be a switchable connection of the electric machine (EM) to one of the first and second clutches (K1, K2) and to the output shaft (AB).

* * * * *